Sept. 24, 1935.  R. C. RUSSELL  2,015,192
POWER BRAKE AND CLUTCH
Filed March 11, 1932  3 Sheets-Sheet 1
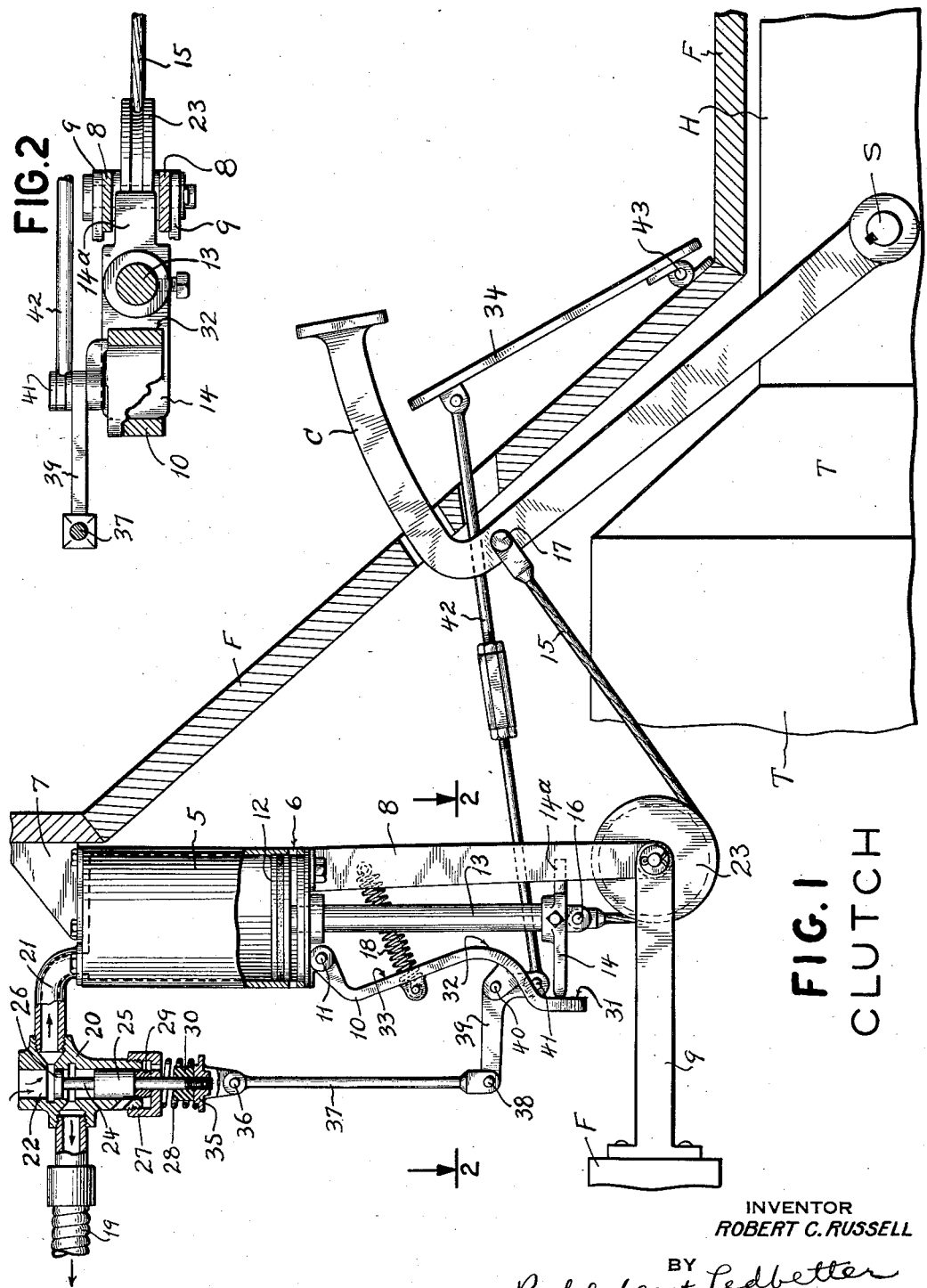
INVENTOR
ROBERT C. RUSSELL
BY
Bohleber + Ledbetter
ATTORNEYS Sept. 24, 1935.   R. C. RUSSELL   2,015,192
POWER BRAKE AND CLUTCH
Filed March 11, 1932   3 Sheets-Sheet 2
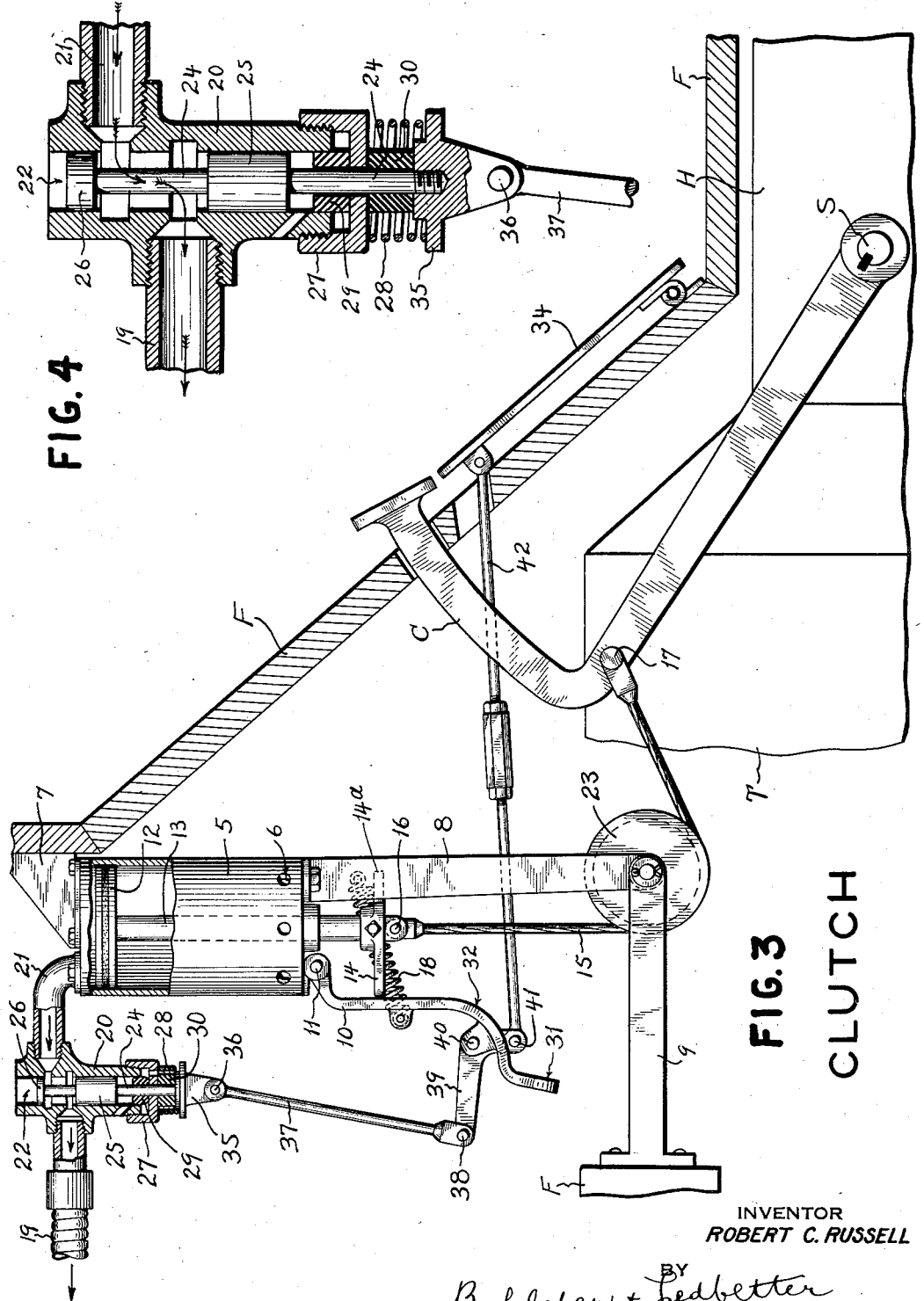
INVENTOR
ROBERT C. RUSSELL
BY
Bohleber + Ledbetter
ATTORNEYS Sept. 24, 1935.  R. C. RUSSELL  2,015,192
POWER BRAKE AND CLUTCH
Filed March 11, 1932  3 Sheets-Sheet 3
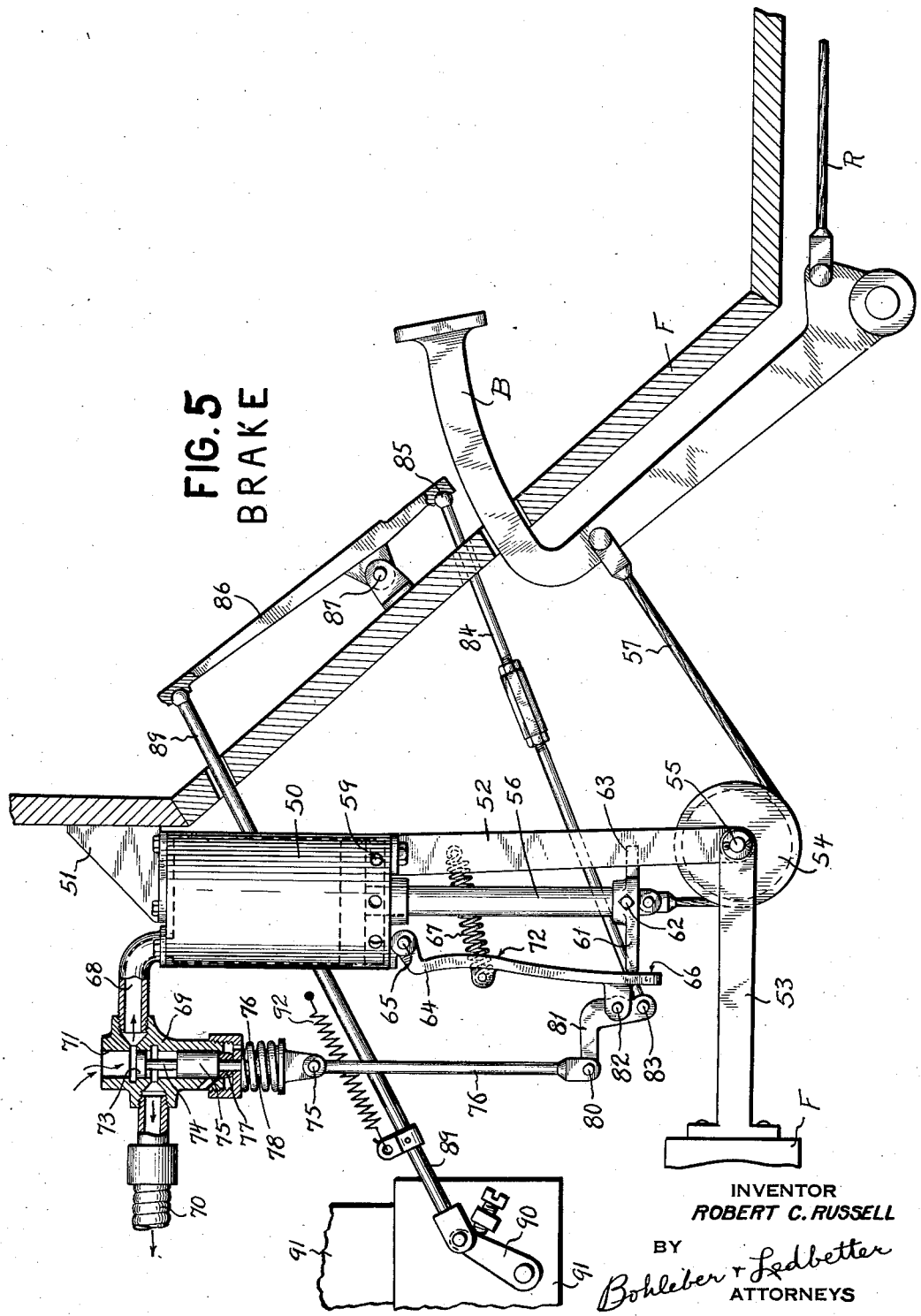
INVENTOR
ROBERT C. RUSSELL
BY
Bohleber + Ledbetter
ATTORNEYS Patented Sept. 24, 1935

2,015,192

UNITED STATES PATENT OFFICE 2,015,192

POWER BRAKE AND CLUTCH

Robert C. Russell, Dallas, Tex., assignor to Engineering Corporation, Grand Rapids, Mich., a corporation of Delaware Application March 11, 1932, Serial No. 598,160

37 Claims. (Cl. 192—3)

This invention relates to automotive control means and more particularly servo-motor actuated clutch and brake apparatus for motor-driven vehicles.

An object of the invention is to produce an automotive control, such as a power-actuated clutch and/or brake means which are useful in driving automobiles, busses, trucks and the like to relieve the driver of fatigue, and to produce improvements in the action of the manual or foot-actuated means which controls the operation of the servo motor.

Another object is to produce a power brake and clutch construction, both of which can be assembled from the same stock of manufactured parts which makes for low cost production. A somewhat different profiled cam is employed for each apparatus, otherwise the power clutch and brake are identical. An exception may exist in the size of the cylinder which may to advantage be larger in bore for the brake.

Throughout this case the term "manual" is used generically to mean any hand or foot-actuated part, element or operation which is initiated by the operator or driver of an automobile to govern the start and stop operations of the servo motor used for the power clutch and brake systems constituting this invention.

It is also an object to reduce the required travel of a manual-control means, such as a pedal, and also to reduce the physical effort required of the operator and still have that same degree of control which one has with the conventional clutch or brake pedal now in vogue. This invention enables an operator to drive the car, bus or other heavy motor vehicle, and manipulate the clutch and brakes thereof, with a fine degree of accuracy and smoothness, without lifting his foot from the floor board of the vehicle.

A particular object, among other things, is to produce an automotive clutch and/or brake powered by a servo-motor having refined semi-automatic and manual controls, whereby the clutching or braking operation is effected in accordance with but on a reduced scale of travel in relation to the conventional manual means now well known to an automobile driver and to which he has become accustomed or in the habit of using. Thus a driver or operator finds no substantial difference in the habit of foot control when he changes from a car having conventional manual control to a car equipped with this power control. While an automobile driver can precisely gage or measure the desired distance or travel of his foot resting on a conventional clutch or brake pedal, by reason of the element of feeling possessed thru the sense of mental and physically applied effort, this same desirable condition does not in reality obtain in the use of certain known servo-motor controls for the reason that the motor means when started usually follows thru its stroke to complete a cycle of operation. This invention, however, seeks to precisely restrict the travel or distance of the stroke of a servo-motor in exact accordance with the foot movement which the operator would impart with his foot or toe, or even his hand, if the car was equipped with the ordinary manual clutch or brake systems. The plan of the invention therefore enables the manufacturer to produce this control apparatus whereby a long power-control pedal movement is required to initiate a short stroke of the motor or vice versa. This means that the critical and final period of clutch engagement or brake application can be effected by a comparatively long foot or toe movement.

Specifically as to this novel power-clutch control, the above general statement is detailed somewhat by explaining that the driver of an automobile, in reengaging the clutch, will first rapidly let his foot and the power-control pedal recede a short distance from extreme clutch-disengaged position, whereupon the servo-motor moves thru a long distance to quickly shift the clutch elements toward engaged position to a point where the clutch elements begin to touch or slightly enmesh, but from this point on the driver is compelled to very materially increase the distance of travel of his foot in relation to clutch travel so that actual clutch engagement is softly and easily accomplished without jerking the vehicle. Hence this invention, as to the clutch, incorporates means for first causing the servo-motor to produce an initially long return stroke thereof in relation to an initially short movement of the foot-control pedal to let out the clutch slack, and followed by a necessary short return stroke of the servo-motor in relation to a long movement of the foot-control pedal.

Now, specifically, as to this novel power-brake control, the driver, in applying the brake, will first depress the foot-control pedal a short distance only to quickly energize the servo-motor for a long stroke thereof to take up the brake slack or play existing in the operating connections extending from the servo-motor to the brake bands and to move said bands close to the brake drum, whereupon the driver will then find it necessary to depress the pedal thru a longer distance to attain a further, although shorter, power stroke of the servo-motor to gradually tighten the brake bands and decelerate the car or bring it to a smooth stop. In this connection, the invention, therefore, provides, as to the brake, a relatively long pedal travel to energize the motor during the final braking period.

In the examples of the invention illustrated herewith, the above or desired mode of performance is attained by employing automatic timing instrumentalities, say cam means and operating connections, coordinated with a servo-motor control valve, with the servo-motor itself, and with a manually-operable device such as a pedal, whereby movement of the operator's foot thru a predetermined distance acts to definitely cause the motor to act thru a different distance. The servo-motor cooperates with the cam means to continually try to close the control valve and hence stop the servo-motor, but the interconnected manually-operable means which is actuated by the driver's foot, continually follows up and negatives the effort of the motor to stop itself. In this connection, a feature of the invention relates to the timing of two factors, the servo-motor in relation to its control pedal, whereby one acts rapidly and longer under the slowly initiated influence of a shorter and slower movement of the other and vice versa. This results in an accurate and smooth clutch and brake operation by the driver when he comes to use this invention on a motor-driven vehicle and is particularly advantageous in the application of gasoline-engine manifold vacuum to energize a servo-motor inasmuch as my discovery of certain fundamental principles now enables me to control a motive fluid with unusual accuracy and smoothness demanded in clutch and brake operation and still achieve reduced pedal movement with all its attendant advantages.

Pursuant to the foregoing objects of this invention, I have illustrated an important example of my invention comprising an embodiment of cam means with operating instrumentalities interconnected with a servo-motor, with the latter's control valve, and with the latter's manual control in the form of a pedal. This three-element relationship, coupled with a new cam principle itself susceptible to variation in profile or cam lobe formation for different uses, enables me to produce a servo-motor highly sensitive to precise control for the reason that the servo-motor is under the highly efficient restraint of the cam means which measures and restricts the stroke of the motor to perform its work in clutch, brake or other uses.

The accompanying drawings illustrate an example of the power-actuated clutch and brake construction and while other forms may be employed without departing from the spirit of the invention, the embodiments presented herewith are practical and preferred forms as follows:

Figure 1 shows a side view of the servo-motor control connected with a conventional clutch pedal of a motor-driven vehicle shown diagrammatically. The motive-fluid control valve is closed against suction and open to atmosphere with the result that the servo-motor is deenergized and hence the clutch is fully engaged by action of the usual clutch spring, not shown.

Figure 2 is a section on the line 2—2 of Figure 1.

Figure 3 also shows the power-clutch control with all parts of the apparatus in operative position, i. e., reverse to that of Figure 1 and hence the clutch is being held disengaged by the energized servo-motor.

Figure 4 shows an enlarged sectional view of a motive-fluid pressure or suction-control valve used in connection with the servo motor for either the clutch or the brake.

Figure 5 shows the servo-motor apparatus attached to a conventional foot-actuated brake pedal of a car. The control valve is closed against suction and hence the motor is deenergized and the brake is drawn to released position as indicated by the fully limited right hand position of the manual brake pedal.

Either a fluid-pressure or suction servo-motor may be used, but as a matter of convenience and more practical construction for use in explaining this invention, a vacuum or suction servo-motor is illustrated. The apparatus is constructed along similar lines for both the automotive clutch and brake. While other types of motor means may be used, there is illustrated a cylinder and piston motor means. The fluid-pressure or vacuum-control valve, Figure 4, may also be of the same construction for both types of automotive controls and this is likewise true for other parts except that the cylinder and piston may to advantage have a larger bore for the brake. The contour or profile of the cam means is the only other part which is somewhat different for the power clutch and brake apparatus. The plan of this invention, therefore, provides that the clutch and brake control means employ substantially the same parts throughout which makes for economy in manufacture so that automobiles may be equipped at nominal cost with a power clutch and brake. As to the two forms of novel cam means, they are both simple in construction and are mounted and operated the same way in both types of control means.

*The power-actuated clutch in Figures 1, 2 and 3*

First, it is well to explain that a conventional engine-driven transmission is shown diagrammatically at T under the vehicle body, floor or frame at F, together with a conventional clutch housing H. A manually operable clutch pedal C has its lower end fixed in the usual way on a clutch shaft S carried in the clutch and transmission housing H. These parts as described by reference letters are simply diagrammatic and pertain to conventional types of automobiles, buses and the like, in which the manual pedal C actuates the vehicle clutch by the direct physical effort of the driver. It is noted that a servo-motor means 5 may be installed for example immediately in front of the manually-operable clutch pedal C for convenient connection therewith thru a cable or other suitable operative connection.

As will be understood by those familiar with the art the servo-motor pulls down on the pedal C to disengage the clutch by rocking the clutch shaft S counter-clockwise. Reengagement of the clutch is effected by self contained spring means usually in the clutch housing H and which continuously urges the shaft S clockwise to hold the clutch engaged, but it is not deemed necessary to show the spring means because spring engaged or closed clutches per se are in universal use and well understood.

The servo-motor cylinder 5 is mounted in a stationary position on the body or frame F of the motor-driven vehicle. This cylinder has a closed head at its pressure or suction-intake end and has ports 6 at its other end to allow rapid inflow of air at atmospheric pressure to energize the motor and actuate the piston upwardly or on its in stroke when suction is applied at the upper end of the cylinder. Conversely the air escapes from the cylinder thru the exhaust ports 6 when the motor 5 is deenergized and the clutch H begins to return to engaged position by reason of its self contained clutch spring.

For purposes of illustration, the suction-motor cylinder 5 is disposed uprightly and has its upper end attached by a bracket 7 to the car body or frame F. The cylinder 5 carries a pair of spaced standards or brackets 8, on the lower end of which are secured spaced braces 9 to anchor and brace the motor means 5 in service position within the car frame F. This arrangement of brace means 7, 8 and 9 rigidly secures the motor means 5 in service position in relation with the conventional clutch C to be actuated by the servo-motor.

The servo-motor 5 includes a piston 12 carrying a piston rod 13 which projects downwardly alongside the bracket or standard means 8 and carries a cam follower 14 on the lower end thereof. The cam follower 14 is anchored to the lower end of the piston rod 13 and held against rotation by a guide finger 14a which rides freely between the two upstanding spaced standards 8. Other types of cam follower 14 and guide 14a may be employed. The present general construction is for illustrative purposes to portray the principles of the invention and is based on a fully tried apparatus long tested in continuous service to prove its merit.

In some cases, the cam follower 14 may preferably be adjustably secured to the piston rod 13. There is shown a set screw thru the hub of the follower 14 for movably fixing it on the piston or connecting rod 13. In this way the cam follower 14 may be adjustably secured in any relative position up or down on the piston rod 13 to vary the operating relation between a cam means 10 to be described and its coacting follower 14. However, this adjustment is rarely needed in connection with the power clutch but is regarded as highly useful on the brake servo-motor in Figure 5 later described. Once the cam follower 14 is properly positioned, in its working relation with the cam 10 on the piston rod 13, it is fixed thereon permanently and little or no future adjustment is needed in so far as concerns the efficient operation of the clutch elements C and H.

A flexible cable 15 has one end anchored at 16 to the lower end of the piston rod 13. The other end of the cable 15 is connected to the clutch pedal C at 17. The cable is passed around a grooved pulley 23, and a practical form of construction provides a pivot which journals the pulley 23 at the juncture of the brace means 8 and 9 as shown. It will be understood that other forms of installation means may be used and that the cable 15 is shown as an example of the motor and clutch pedal operative connection.

The cable 15 pulls in a straight line from the axis of the piston rod 13 due to the position of the pulley 23 mounted tangent to the piston rod axis and the cable 15 may then be carried in any suitable direction to connect with the clutch pedal C or other apparatus to be operated. This arrangement simply shows one practical method of operatively connecting the motor piston rod 13 with the clutch shaft S by which the latter is oscillated counter-clockwise to pull out or disengage the clutch means H for the purpose of disconnecting an automobile engine transmission T from the traction wheels of the car not shown. The clutch means H and S being well known, they are shown diagrammatically. With the adoption of a reliable power clutch, it is to be appreciated that the clutch pedal C may in time be dispensed with as no longer essential.

A cam means, comprising a swingable arcuate bar member 10, is pivoted at 11 and coacts with the cam follower 14. The pivot point 11 may as well be placed on the lower end of the cylinder 5 or in any other convenient place. The cam 10 comprises a depending bar member forged or otherwise formed as a bar and has a lower free end movable about the axis 11. A tension spring 18 has one end attached to the cam means 10 and its other end fixed to the stationary bracket 8 or other point by which the inner working face or profile of the cam 10 is held in continuous soft running engagement with the cam follower 14. The spring 18 is sufficiently strong to hold the cam 10 and follower 14 in working engagement against the opposite pull of manually-controlled valve operating means later described.

The contour or working face of the cam 10 is fashioned to impart an accurately timed operating function to initiate a precise follow-up valve hunting action later described in connection with a motive-fluid control valve employed to stop and start the servo motor 5. This construction is a compact one since the cam bar 10 swings from its upper end and pivot 11 under the cylinder 5 and all related parts are closely grouped. The power apparatus is, therefore, easy to install as a self-contained unit on an automobile.

A fluid-pressure or suction-feed line 19 connects with the upper end of the cylinder 5 thru a motive-fluid control valve 20 and nipple passage or connection 21. The control valve 20 includes an atmospheric-inlet port 22 which opens thru the valve housing 20, thru passage 21 and hence to the cylinder 5 to negative or fill the vacuum or void therein to equalize the pressure on both sides of piston 12 so it will recede downwardly to let the pedal C and clutch shaft S return to normal clutch-engaged position as shown in Figure 1. The suction-feed line 19 connects with a source of motive fluid, preferably with the suction manifold of the internal engine, not shown, but which drives the automotive vehicle. Hence the feed line 19 continuously applies a suction force to the valve 20 but which is ordinarily closed to leave the clutch pedal C in its extreme right-hand position with the clutch H engaged.

With reference to the control valve 20, its manner and mode of operation comprises an important feature of this invention as will be described. The reference numeral 20 points out the valve housing in general in which is slidably mounted a valve stem 24 carrying a piston-like guide 25 which reciprocates in the neck of the valve housing. A valve head 26 is carried on the upper end of the valve stem 24 and constitutes the closure element by which the suction feed line 19 is closed from communication with the motor means 5. By shifting the valve stem 24 upwardly to Figure 3 and 4 position, it is noted that the atmospheric-inlet port 22 is closed and the suction feed line 19 is connected directly with the cylinder 5 to evacuate the air from the top of the cylinder and start the piston 12 upwardly by air pressure which flows into the bottom of the cylinder thru the inlet ports 6.

A screw threaded cap 27 is carried on the lower end or neck of the valve housing 20. A coil compression spring 28 is confined between a spring seat 35 and the adjustable cap 27, and this spring 28 is somewhat weaker than the cam spring 18 hereto named. The expansion of the spring 28 tends to hold the valve 26 in downward position, as in Figure 1, to maintain the servo-motor 6 deenergized because the atmospheric pressure is equal on both sides of the piston since the ports 22 and 6 are open and feed line 19 is closed. The spring 28 also acts downwardly and against a set of manually-actuated operating connections, later described, to maintain the latter in normal position ready for use by the driver of the vehicle.

Resilient cushion, shock absorber, or snubber means in the form of seat or stop means, is provided for stabilizing and steadying the valve 26 and its related parts against tendency to flutter or oscillate. This is a desirable feature because the valve 26 is continuously subjected to the suction and pressure forces exerted from the suction line 19 and atmospherically thru the air-inlet port 22. To this end, a rubber or other cushion stop means, in the form of a pad 29, is carried inside the valve housing 20 between the cap 27 and valve guide 25. This cushion seat 29 cooperates with the cap 27 and piston-like guide 25 in that said cap 27 may be screwed up or down on the valve neck 20 to adjust the valve head 26 up or down to a proper position in relation to or between the two ports which receive the pipes 19 and 21. A similar pad means, say a rubber body or stop 30, is also carried on the valve stem 24 outside the valve housing 20 and between the spring seat 35 and cap 27.

The above described arrangement of double cushion stop or pad means 29 and/or 30 results in positively holding the movable parts of the valve 20 against fluttering or vibration regardless of the position, either open or closed, of the valve. The valve guide 25 seats firmly against the inside pad stop 29 when the motor is deenergized and the spring 28 positively holds said valve parts to Figure 1 position with the result that the valve head 26 is restrained from oscillation between the atmospheric inlet port 22 and suction line 19. On the other hand, the same stability is attained when the valve is shifted to Figure 3 or 4 position to energize the motor and draw forwardly and down on the pedal C to disengage the vehicle clutch H. In the latter case the outside pad or cushion means 30 is placed under compression to hold the valve 26 open to suction against fluttering or oscillatory tendency when the atmospheric port 22 is closed and the suction feed line 19 is connected with the motor cylinder 5. The two resilient pad means 29 and 30 smooth out and quiets the operation of the valve 26 by cooperating respectively with the valve guide 25 and spring seat 35.

Another feature which contributes to smooth and efficient operation of the valve 26 is that the suction line 19 connects to the valve housing 20 between the valve head 26 and guide 25. Since these valve elements 25 and 26 are piston-like in form, are of equal diameter, and move as a unit, it follows that the suction force is neutralized. Also the cap 27 or lower end of valve housing 20 is perforated, or in fact the parts are loosely fitted, so that normal atmospheric pressure acts equally thru the air-inlet port 22 and thru the cap 27 on each end of the valve stem and its piston means 26 and 25. Hence this control valve is balanced or stabilized against pressure and suction. This fact, coupled with the cushion stop means 29 and 30, contributes to ease and smoothness of manual control from a driver's pedal means 34 to be described.

Operating connections are employed for actuating the control valve 26 from two sources; first, from an operator's manual control means, such as the pedal 34; and second, from the cam instrumentalities 10 heretofore described. In this connection, the valve stem 24 projects outwardly from the housing 20 and attaches to the spring seat 35 having a pivot 36 on which the upper end of a push rod 37 is pivoted. The lower end of this valve push or control rod 37 is pivotally connected at 38 with one end of lever means such as a bell crank 39. The cam means 10 carries a bearing 40 on which the bell crank 39 is pivotally mounted.

From the foregoing it is clear that the bell crank 39 is capable of two movements, a pivotal motion upon the bearing pin 40 and a bodily swingable motion on and with the swinging cam 10. The other end of the bell crank 39 is pivotally connected at 41 with a manual or foot-operated push link 42 connected to the upper end of a power-clutch control pedal 34 which may have its lower end pivoted at 43 to the floor F of the vehicle.

Referring further to the cam means 10 and its supported bell crank 39 and parts related thereto, it is noted that the lower end of the valve push rod 37 is free to swing about its upper pivot 36 and this takes place, as noted in Figure 3, when the cam follower 14 rides upwardly along the working face of the cam 10. While the structural layout presented herewith shows a preferred form, it is to be understood that changes in cam detail and profile are contemplated to vary the performance or operating characteristics of the valve 20 in carrying into effect different purposes and uses of the invention. The shape of the cam 10 in Figures 1 and 3, adapts the invention to clutch operation, whereas its change to an entirely differently outlined profile, as in Figure 5, converts the apparatus to one for vehicle braking purposes.

The cam spring 18 is soft and resilient but is strong enough to hold the cam 10, against the working edge of the follower 14, and somewhat stronger than valve spring 28. Therefore, the spring 18 keeps the cam 10 fast to the right, in soft running contact with the follower 14, and against the thrust of the link 42 to open the valve 26 to suction, by clockwise movement of the bell crank 39. The valve spring 28 yields to the upward action of push rod 37 and the valve 26 opens to the suction line 19, but the cam spring 18 is too strong to yield to the thrust of the link 42.

It is also noted that one arm of the bell crank is longer than the other and hence the thrust link 42 is connected to the shorter arm. Thus the travel of the valve 26, when actually moving, is proportionately longer and faster than the travel of the pedal 34. This arrangement increases the sensitiveness of valve control and contributes to refinement of the entire operating performance, both manual and power, which results in a semi-automatic mode of action, hereinafter explained.

The cam means 10, for a power-operated clutch, may have its contour or profile explained in relation to the axis of the piston rod 13, when the cam follower 14 is down, and when the servo motor is deenergized, as in Figure 1. In this determined position as a basis for consideration, note the short lower free end of the cam bar 10 has an initial plane or straight face 31 which stands parallel to the axis 13, but said face 31 curves abruptly toward the piston rod 13 forming a lobe in the nature of an active working face or heel lift 32. Said lobe 32 immediately bends or arches back away from the piston rod 13 and merges upwardly into a second straight line 33 at an angle to the axis of the piston rod and at an angle to the first straight face 31.

It will now be seen that the cam lobe 32, with its lower straight face 31 and upper straight-away face 33, are so designed that the upward travel of the cam follower 14 acts to first ride idly along the face 31, then around the lobe 32 which swings the straight cam face 33 outwardly into precisely the same parallel relation with the axis 13 at first occupied by face 31, whereupon the follower 14 runs upwardly along the plane 33. In traversing the two cam runs 31 and 32, it is clear that no swinging action is imparted to the cam means 10 and hence it remains stationary on its pivot 11 during that period of motor operation.

From the foregoing, it is apparent that the cooperating cam 10 and follower 14 impart a left-hand bodily-swinging action to the bell crank 39 and push-rod pivot 36, dropping the push rod 37 and valve stem 24, to make the servo-motor control valve 26 follow-up or hunt for its suction-closed position, as in Figure 1. In other words, the bell crank 39 is swung counter-clockwise on its pivot 40 when the cam bar 10 is moved out at its lower end due to the thrust of the follower 14 against the cam lobe 32, assuming of course that the operator does not move the link 42 by pressing down on the pedal 34. The counter-clockwise action of bell crank 39 occurs only when the follower 14 is riding around the lobe 32 and not when riding the faces 31 and 33. By varying the outline of the cam lobe 32, it is possible to alter the hunting characteristics of the valve 26 and make it perform as desired, i. e., follow or hunt its suction-closed position at any selected rate of closing speed in relation to the velocity and travel of the piston rod 13 as well as in relation to the travel of the foot pedal 34.

To more fully trace the operation of the power-actuated clutch, start with Figure 1. The driver of the automobile depresses the servo-motor manual-control pedal 34 which actuates the bell crank 39 clockwise to lift the valve push rod 37, whereupon the motor 5 is energized and the piston 12 starts upwardly. The cam follower 14 first rides along the straight cam face 31 which, at the start, is parallel to the axis 13. It follows that the bell crank 39 is not disturbed and consequently the valve 26 remains in its suction-open position to close the air inlet 22 to keep the motor energized so long as the follower 14 is moving along the straight cam face 31. Hence a short travel of pedal 34 will actuate the motor 5 and draw the clutch pedal C downwardly to quickly take up all lost motion necessarily existing in the conventional clutch H. The operator must then continue downward movement of pedal 34 in order to keep the valve 26 open, so as to maintain the motor energized, otherwise the cam lobe 32 will compel the valve 26 to hunt its closed position. Immediately after the cam lobe 32 is traversed by follower 14, by reason of the steady downward movement of the toe of the driver or pedal 34 to prevent the servo-motor 5 from automatically stopping itself, said follower 14 starts upwardly along the straight cam face 33. Here the operator is again saved downward movement of pedal 34, the motor remaining energized and traveling toward Figure 3 position, without further actual downward travel of pedal 34, although the driver must hold it down to avoid return action of spring 28. This descriptive paragraph pertains to disengagement or the pulling out of the clutch, but its engaging function is more important, as will now be described.

Clutch reengagement of course takes place by deenergization of the motor 5 to allow the piston 12 to recede to its down position by reason of the pull exerted by the conventional internal clutch mechanism in the clutch housing H which continuously applies a clockwise force to the clutch shaft S. Hence the control valve 26 is employed to precisely control the inflow of air thru port 22 to gradually let the servo-motor back up so to speak by which to allow the clutch pedal C and shaft S to return, by their own force or return means, to normal reengaged clutching position. The cam means 10 and its profile design, faces 31, 32 and 33, govern the clutch reengaging function in a most satisfactory and finely controlled manner as will be seen.

It is the nature of the cam face or profile 31, 32 and 33 to lay restraint on the motor means 5 and prevent its return or backing down stroke, except under the will of the driver of the car, expressed thru up movement of pedal 34, by which a comparatively long up travel of pedal 34 is actually necessary before the follower 14 will traverse downwardly around the cam lobe 32. It is the lobe 32 which results in softly and slowly letting in of the clutch pedal C, and hence the clutch itself, into final-driving engagement. A greater arc for the lobe 32 would increase the length and range of necessary travel of pedal 34 to engage the clutch, or changing the position of pivot 40, or other variations, would accomplish the same purpose.

For a more extended understanding of the clutch reengagement function, start with Figure 3 and trace the mode of operation back to Figure 1. The power-control foot pedal 34 is of course being held down by one's toe to hold the clutch out, else the valve spring 28 would have reacted to close the valve 26 against the suction line 19. The operator now lets up on the pedal 34 only a short distance, even a sixteenth or eighth of an inch lift of the pedal 34 is sufficient to allow the valve 26 to shift downward. Air then instantly flows thru port 22 into cylinder 5 for a full downward travel of follower 14 along the straight cam run 33, and the cable 15 backs up under the self-pulling action of the clutch shaft S. Instantly the cam follower 14 reaches the upper portion of the lobe 32 and starts therearound. By this time all the lost motion or idle travel of clutch pedal C is eliminated, and the clutch has approached its engagement position by the quick down movement of the piston 12. This new position of parts occurs at the expenditure of the slightest distance of back travel of pedal 34.

At this point, however, and instantly the valve 26 has opened again to suction, Figure 4 position, to check the back or return motor stroke and consequently clutch reengagement. The valve opened to suction because the follower 14 started around the upper portion of lobe 32 and because pivot point 41 stood still with a resultant up thrust of push rod 37. Thus the valve opened and caught the piston 12 in suspension in the cylinder just as the follower 14 started to ride from the top downwardly around the upper curve of cam lobe 32. The clutch plates or surfaces inside the housing H are now in the act of engagement and will jerk and grab unless easily and slowly engaged.

At this stage the operator's foot begins to recede, followed by pedal 34 which is pressed upwardly by the valve spring 28, and hence the valve 26 is again closed against suction and opens the air-inlet port 22, whereupon the motor piston again moves downwardly to further the engagement of the clutch, but the latter action again checks the motor because the valve 26 again automatically opens so the suction suspends the piston in its then position. This action takes place all along or around the cam lobe 32, the operation requiring gradual release of the pedal 34 over a long back travel of one and a half or two inches to attain a comparative movement of a fractional part of an inch of clutch travel for its reengagement. Depending somewhat upon the type of motor vehicle, the power-control pedal 34 has a long back travel to effect the last short travel of the clutch pedal C, and this proportion and relationship quite advantageously conforms to just what the automobile driver is accustomed in manipulating the conventional clutch pedal C. In other words a long back travel of pedal 34 is demanded for a very short downstroke of piston 12 and hence for short movement of the clutch during critical engagement, and this arrangement enables the operator to easily and smoothly handle the power clutch to start a car in motion without jerking or straining tendency.

The clutch cam arm or bar 10 has specially provided the long upper run 33 to rapidly return the clutch toward its effective engagement position, and explanation has already been given of the function of the lobe 32 between the two idle cam faces 31 and 33. Reference is here made to the angularity of the two faces 31 and 33. The last lower cam run 31 allows the servo motor to quickly come to rest and loosen up or throw in the desired lost motion necessary to the clutch driving and power transmitting function so essential after the clutch is fully engaged. On the other hand the upper long run 33 enables the servo motor to freely function beyond initial clutch release so that the clutch surfaces are widely separated which is desirable during free wheeling and engine idling. The angular relation between cam faces 31 and 33 therefore enables these several functions to be carried out.

*The power-actuated brake in Figure 5*

The construction and operation of the power or servo-motor actuated brake shown in Figure 5 is quite similar to that of the power clutch heretofore described except that the cam bar or arm means 64 for the brake is altered as to its profile or contour to cause the servo-motor to make an initial long stroke in response to a short travel or movement of the manual-control means comprising a foot pedal 86 depressed by the operator in braking the car. Conventional braking means is shown in the form of a brake pedal B which actuates a brake rod or cable R which is adapted to be operatively connected with the vehicle brake bands, not shown, but well understood. The car frame or body, on which this apparatus is installed, is pointed out at F. Although of the same construction as the power-clutch control heretofore described, the brake will now be generally described, after which the cam 64, peculiar to braking, will be explained.

This brake-power servo-motor control comprises a cylinder 50 secured to the frame or body F of the vehicle in any suitable manner including a cylinder-head bracket 51. The cylinder is vented by ports 59 thru which atmospheric pressure flows to force the piston upwardly when suction is applied to the upper closed end of the cylinder and escapes on the back stroke. Spaced depending standard means 52 have their upper ends anchored to the cylinder 50 and their lower ends attached to the stationary brace means 53 to hold the motor in service position braced from the vehicle frame F. A pulley 54 is journalled on a bearing 55 which joins together the two brace means 52 and 53 under the motor means 50. The servo-motor includes a piston and connecting rod 56, the lower end of which is secured to a cable 57 passing around the pulley 54 and attached to the conventional brake pedal B. Thus is explained a convenient method of connecting the operating means 56 of the servo motor with the brake rod R which is the main consideration inasmuch as the manual brake pedal B may be eliminated where reliable power-brake means is installed on the car.

A cam follower 61 is anchored at 62 on the lower end of the piston rod 56 and may to advantage have a guide means 63 movable up and down between the standards 52, as in Figure 5, thus preventing the follower 61 from turning out of position away from its cooperating cam bar 64. Any suitable aligning means may be used to prevent the displacement of the cam follower 61 from engagement with the cam 64 where this type of construction is employed. The cam follower 61 coacts with a cam means comprising a swingable arm or bar member 64 having its upper end pivotally mounted at 65 on the lower end of the cylinder 50. The cam 64 hangs freely from its pivot 65 in a general direction parallel with the piston rod 56, and is held in sliding engagement with the follower 61 by spring means 67. The contour of the cam 64 is designed to impart a desired rate of follow-up closing motion imparted to the servo-motor control valve 40 to be described and which motion is carried out automatically by reason of the upward movement of the cam follower 61 riding against the inside working face of the cam means 64.

The cylinder 50 is connected thru a passage 68 with a servo-motor control valve 69 and hence to a motive-fluid feed line 70 also illustrated here as a suction conduit adapted to be connected with the intake manifold of an internal combustion engine not shown but which drives the vehicle having the usual wheel and brake-drum means not shown but to which the brake rod R is operatively connected. The valve housing 69 includes an atmospheric inlet port 71 which is normally open to the cylinder 50 thru the passage 68, as shown in Figure 5, where the brake means B and R is released because the motor piston rod 56 is in its lowermost and deenergized position and the cable 57 has allowed the brake pedal to slack off and return to normal brake-released position.

In further describing the valve 69, it may as well be the same valve 20 as heretofore described and hence the cost of the power-brake and clutch is reduced to a minimum. The valve inside parts include a head or closure 73 carried on the upper end of a valve stem 74 projecting downwardly from the valve housing 69 and connected at 75 with an actuating rod 76. The valve stem 74 preferably carries a guide 75 movable in the housing 69 as already described for the power clutch and the valve guide 75 and head 73 are of the same piston area and thus afford a balanced-type valve means which is unaffected by suction and atmospheric pressure. It is noted that the suction-feed line 70 connects with the housing 69 at a point between the valve head 73 and guide 75 so that the valve, having equal size piston-like elements 75 and 73, is of the balanced type as heretofore described. Thus is reduced the tendency of the valve to oscillate.

The brake-control valve 69 also includes a spring 76 to normally urge the valve head 73 downwardly and thus maintain the suction line 70 closed off from the cylinder 50, thereby keeping the cylinder open to atmosphere thru the air-inlet port 71. The valve housing 69 is fitted with an inner cushion or resilient stop means 77 and an outer resilient pad or stop 78. When the valve is in down position and closed against the suction line 70, the inner pad 77 holds the valve head 73 steady against tendency to flutter or oscillate. Likewise when the valve head 73 is up to close the atmospheric-inlet port 71 and to open the suction line 70 to the cylinder 50, the outer resilient stop means 78 acts to steady the valve and hold it against possible vibration.

The lower end of the valve rod 76 is pivoted at 80 on the outer end of the longer arm of a bell crank 81 pivotally carried at 82 on the lower end of the swingable bar cam means 64. Hence the bell crank 81 is capable of pivotal movement on the pin 82 and also a bodily swinging motion with the lower free end of the cam 64. Movement of the valve 73 is somewhat amplified over the power-control manual pedal 86 to be described.

The lower end of the bell crank 81 is pivotally connected at 83 to a foot-actuated link 84, the rear end of which bears freely at 85 against the lower extremity of a foot pedal 86. This manual-control device 86 is pivotally mounted at 87 on the floor or body F of the car and the operator depresses his heel to impart a forward movement to link 84 to open the valve 73 to energize the servo-motor as will be described.

As before mentioned, the valve head 73 has its movement amplified somewhat over that of the link 84 in that a short movement of the latter will rapidly shift the valve head 73 in relation to the ports for conduits 68 and 70. The desired ratio of amplified or multiplied travel of valve means 74 over and in relation to the link 84 is attained in any suitable way as for example by varying the length of the arms of the bell crank means 81. Thus an operator will be required to move the link 84 a very short distance to shift the valve 73 upwardly to energize and start the motor on its braking strokes.

The upper end of the pedal 86 rests against the rear end of a carburetor or throttle-control link or rod 89 which is operatively connected in the usual way with a lever 90 on a carburetor shown diagrammatically at 91 by which to feed the automobile engine with gas as will be understood.

A throttle-closing spring 92 holds the throttle rod 89 to a normal rearwardly limited position to close the carburetor 91 and to hold the link 89 against the pedal 86. Hence a single pedal means 86 may be used for the dual purpose of actuating the throttle rod 89 by forward movement of the operator's toe to regulate engine speed, and thereafter actuating the servo-motor control link 84 by depressing the operator's heel for applying the brake. The driver of the vehicle, therefore, automatically permits the carburetor spring 92 to swing the carburetor arm 90 clockwise to its closed position to cut down the engine speed to idling when he depresses his heel to apply the power-brake thru the valve push rod 84.

At this point it is noted that the two spring means 92 and 76 snugly retain the throttle rod 89 and valve-control link or push rod 84 against the dual-control pedal 86. The third spring 67 holds the cam 64 in operative engagement with the follower 61 and said spring 67 is sufficiently strong to maintain the cam 64 against the thrust of link 84 when the latter is urged forward to open the valve 73 by which to start the servo-motor. The valve spring 76 is soft and yields before the stronger spring 67 is stressed. This triple-spring organization enables the one control pedal 86 to thrust forward on either control link 89 or 84, actuating only one link at a time, the other link automatically returning to its normal position of rest, and the cam 64 maintaining its operative position against the manual urge of link 84. The spring means employed allows the cam follower 61 to wipe the cam 64 with little friction or wear.

The driver ordinarily rests his foot on the pedal 86 and feeds gas to the engine by depressing his toe and thus tilting anticlockwise the throttle arm 90 of the carburetor thru the throttle rod 89 which opens the throttle not shown and accelerates the engine. By letting up on his toe and depressing his heel, the throttle closes at 90 and the power brake is applied thru the link 84 and other operating connections.

The operator controls the power brake by depressing his heel at the point 85 which shifts the link 84 forwardly and swings the bell crank 81 clockwise thereby opening the servo-motor control valve 73 to the suction line 70 to energize the motor. The piston rod 56 reciprocates upwardly and pulls on the brake rod R. The cam follower 61 first rides rapidly along a straight cam face 66 which is or may be substantially parallel to the piston rod 56 and hence no or slight follow-up action is imparted to the valve 73 and it does not at first hunt a closed position. On the other hand, the cam face 66 may gradually approach, at a slight angle, the axis 56, since in some cases it is desirable to immediately but slowly start the hunting action of the valve with the start of the servo-motor on its braking stroke. This means that the first short manual movement of rod 84 and hence pedal 86 causes the servo-motor to take up the brake pedal B and cable R to pull out all the slack or lost motion from these parts and to bring the brake bands toward the wheel drums. This initial action and removal of all play from the brake system is accomplished with slight or fractional down travel at the heel end 85 of the dual pedal 86.

Pursuant to the above, the cam follower 61 now rapidly approaches a faint cam lobe or heel 72, whereupon the cam 64 begins to swing outwardly. This results in dropping the pivot 80 and push rod 76 with the valve head 73 to a down and suction-closed position. Hence the valve 73 hunted its closed position because the cam follower 61 rides upon the heel 72 with the upward travel of the piston rod. The active portion 72 of the cam quite gradually tapers upwardly from the straight face 66 and easily bends toward the axis 56 somewhat remotely from the lower straight run 66.

The up travel of the piston rod 56, so soon as the follower 61 rides the lobe 72, instantly results in closing the valve 73 against suction. The operator or driver overcomes this by further depressing his heel at 85 which again opens the valve 73 to suction and this operation is manually followed up to overcome or counteract the hunting or follow-up tendency of the valve 73 to close against suction. In this way, the operator can maintain the motor 50 energized to steadily pull on the brake rod or cable R to apply the brakes by continuing down movement of the lower end of the pedal 86 as he would naturally do if employing the conventional manual pedal B.

The plan of the cam means 64, having its initial straight face 66, enables one short manual movement of the lower end of pedal 86 to open and hold open the valve 73 so that the motor 50 first acts quickly along the full cam run 66 to draw down on brake pedal B and take up all slack or lost motion in the car brakes. By that time the cam lobe 72 becomes active and begins to automatically impress a closing force on the valve 73 and the driver to overcome that action must further depress, manually, the rod 84. The result is that a gradually increasing longer travel now begins to be required of pedal 86 and rod 84 to accomplish the holding open of the valve 73 by which to softly and evenly effect the last portion of the braking function.

Particular attention is directed to the set screw 62 which constitutes adjustable means for anchoring the follower 61 at any desired point along the piston or connecting rod 56. When the brake bands or linings wear on automobile brake drums and it becomes necessary to take up or adjust the slack out of the operating connections to accommodate for the wear, the set screw 62 is loosened and the cam follower 61 is lowered on the piston rod 56. This provides a longer stroke for the servo-motor for the same manual movement of the brake control valve rod 84 for the reason that a greater portion of the lower straight cam face 66 is employed. If the car is new with thick brake linings, then a shorter stroke of the servo motor is required and consequently the cam follower 61 would be fixed at a point higher up on the piston rod 56 and nearer the lobe 72 on the cam. This power apparatus therefore provides a convenient form of adjustment to take up for wear of the brakes by making use of a longer stroke of the servo motor at any time desired. Note Figure 5 where this apparatus, now long in service, has its follower 61 set low down to take up for well worn brake linings.

It is significant that the pedal 86 has a first short travel to effect the longest pull on the rod R, due to the long cam run 66 ineffective to require additional down travel of pedal 86 at its heel, but a last long travel to effect shortest movement of brake rod R. This is an advantage and avoids jerking the car as it is finally retarded. At the same time, pedal distance at 85 is not lost to merely pull out the brake slack. The same manual travel is therefore measured off, and retained for the servo-control pedal 86 as exists with the ordinary pedal B to which a driver is accustomed. The habit and experience of the driver in using the conventional foot brake B is retained when he begins to use the power brake control pedal 86.

The dual throttle and brake-control pedal 86 may be preferred in many installations but it is a simple matter to provide separate manual-control pedals for each rod 84 and 89. When the dual pedal 86 is used, each rod has its end free against the pedal as shown at 85 so that actuation of either link 89 or 84 is quite independent of the other.

*General discussion of the inventions*

In the presentation of this invention in its several phases, it is instructive to take note that the brake-cam lobe 72 rapidly becomes highly active and restrictive of the motor action as the follower 61 travels up on the power or instroke of the motor. Since the final application of the brakes takes place toward the end of the power stroke, the upper lobe 72 is much less pronounced because of its proximity to the pivot 65. The constraining or stopping action impressed on the servo-motor by the slightly profiled lobe 72 on the brake-control valve 73 is comparable, in its rapidity of action during said power stroke, in applying the brakes, to the same rapid valve hunting function impressed on the valve-operating instrumentalities to continuously slow up or stop the deenergized back or return stroke of the motor to engage the clutch. The active cam lobes 32 and 72 are differently placed on the cams and in relation to their pivots 11 and 65 depending on the use to which the apparatus is to be placed.

I have used a similar cam arm or bar 10 and 64 for both the clutch and brake but altered the cam profile to fit each apparatus and have pivotally mounted the upper end of both cams at 11 and 65 on the lower end of each cylinder, despite the fact that in doing so the rate at which the cam swings out from the piston rods 13 and 56 varies to a considerable degree.

In both the clutch and brake, there is provided a constantly varying ratio of movement relatively between the servo-motor and the manual-control device or pedal. In other words, there is provided a variable-leverage means correlated between the control valve and the pedal which opens it to the motive-fluid line, whereby the pedal is actuated thru a predetermined distance by the operator to initiate travel or stroke of the motor thru a different predetermined distance.

Amplified or multiplied travel of the control valve, in Figure 4 for both types of automotive controls, over the shorter movement of either manual-control device 34 or 86, is a distinct advantage and this feature is coordinated with the automatic-valve opening and closing means represented by the power-actuated cam means as hereinbefore described. The amplified valve quickly provides a full opening and the servo-motor makes quick response. This instant response just as quickly stops the servo-motor. Its stroke, in or out, is therefore substantially instantaneous with the result that over or excess clutching and braking is avoided. Furthermore my arrangement, as to amplified valve movement, renders unnecessary a large valve housing 29 or 69 because the valve movement is sufficiently long and quick as to open large size motive-fluid ports. This rapid or amplified valve movement affords harmony of action and precise control between the manual means 34 or 86 and the servo-motor with its automatic-valve actuating means.

The apparatus is easily installed by the mounting means, or other suitable support braces, in horizontal or such other position as desired. The movable power member, comprising the piston-rod means, is readily connected with a vehicle-control means such as a clutch, brake or the like. References made to "pedal means" and "vehicle-control means" in this description is of course used generically to cover the essential part to be power operated to-wit, the clutch S and brake bands or rod R.

This invention fills a need felt for automotive controls for passenger cars and heavy duty motor vehicles.

What is claimed is:

1. An automotive control comprising a pedal means adapted to be actuated, a servo-motor operatively connected with the pedal means, a motive-fluid line including a control valve connected with the servo-motor, a manual-control device operatively connected with the valve by which an operator opens said valve to energize the servo-motor to actuate the pedal means, automatic means operated by movement of the servo-motor to automatically urge the valve toward closed position, means by which an operator follows up the movement of the automatic means to prevent the latter from closing the valve, and means to provide a constantly-varying ratio of movement relatively between the manual control and the device and the pedal means.

2. An automotive control comprising a pedal means adapted to be actuated, a servo-motor operatively connected with the pedal means, a motive-fluid line including a control valve connected with the servo-motor, a manual-control device operatively connected with the valve by which an operator opens said valve to energize the servo-motor to actuate the pedal means, automatic means operated by movement of the servo-motor to automatically urge the valve toward closed position, means by which an opeartor follows up the movement of the automatic means to prevent the latter from closing the valve, and variable-leverage means correlated with the last named means whereby movement of the manual-control device thru a predetermined distance causes the servo-motor to operate thru a different predetermined distance.

3. An automotive control comprising a pedal means adapted to be actuated, a servo-motor operatively connected with the pedal means, a motive-fluid line including a control valve connected with the servo-motor, a manual-control device operatively connected with the valve by which an operator opens said valve to energize the servo-motor to actuate the pedal means; and automatic rate-of-travel varying means cooperating with the manual-control device, the control valve, and the servo-motor, requiring the operator to actuate said manual-control device at a rate and distance consistent with the desired rate of movement of the pedal means.

4. Automotive control apparatus comprising servo-motor means, a motive-fluid line including a valve in communication with the servo-motor means, a control device adapted to be actuated by an operator, operating instrumentalities between the servo-motor means and the valve and also between the control device and valve, and means correlated with the operating instrumentalities to vary the valve movement in relation to that of the control device to produce a non-uniform rate and distance of travel between the servo-motor means and said control device.

5. Automotive control apparatus comprising servo-motor means, a motive-fluid line including a valve in communication with the servo-motor means, a control device adapted to be actuated by an operator, operating instrumentalities between the servo-motor and valve and also between the control device and valve, and cam means coacting with the operating instrumentalities by which the operator is required to manipulate the control device thru a different distance from that traveled by the servo-motor means in order that the operator effect actuation of the valve.

6. Automotive control apparatus comprising servo-motor means, a motive-fluid line including a valve in communication with the servo-motor means, a control device adapted to be actuated by an operator, operating instrumentalities interconnected between the servo-motor and valve and also between the control device and valve, a piston rod forming a part of the motor, an arm having one end operatively mounted on a stationary pivot and disposed alongside the piston rod, cam means formed on the arm, a connection provided between the arm and the operating instrumentalities, and a follower on the piston rod engaging the cam means to swing the arm and hence move the operating instrumentalities during movement of the motor.

7. A power brake for automotive vehicles comprising a servo-motor adapted to be connected with braking means, a motive-fluid line including a valve in communication with the servo-motor, a control device operable by an operator to open the valve, an operating connection between the valve and servo-motor whereby the movement of the motor closes the valve, and means cooperating with both the motor and the control device to hold the valve open for a long period and hence actuate the motor thru an initially great distance relatively to an initial short movement of the control device.

8. A power clutch for automotive vehicles comprising a servo-motor adapted to be connected with clutching means, a motive-fluid line including a valve in communication with the servo-motor, a control device movable by an operator to actuate the valve in one direction, an operating connection between the valve and servo-motor whereby the movement of the motor actuates the valve in the other direction, and variable-ratio means cooperating with both the motor and the control device to hold the valve to one position for a predetermined period and hence actuate the motor thru a distance relatively different from that of the initial movement of the control device.

9. A power brake for automotive vehicles comprising a servo-motor adapted to be connected with braking means, a motive-fluid including a valve in communication with the servo-motor, a control device movable by an operator to open the valve, an operating connection between the valve and servo-motor whereby the movement of the motor closes the valve, and means coacting with the servo-motor and the control device and also with the valve whereby an initial short movement of the control device acts to open or close the valve and subsequent long movement of the control device is required to open or close the valve.

10. A power clutch for automotive vehicles comprising a servo-motor adapted to be connected with clutching means, a motive-fluid line including a valve in communication with the servo-motor, a control device movable by an operator to open the valve, an operating connection between the valve and servo-motor whereby the movement of the motor acts to close the valve, and means coacting with the servo-motor and the control device and also with the valve whereby an initial short movement of the control device acts to quickly open or close the valve and subsequent long movement of the control device is required to open or close the valve.

11. A power clutch for automotive vehicles comprising a servo-motor adapted to be connected with clutching means, a motive-fluid line including a valve in communication with the servo-motor, a control device movable by an operator to open the valve, an operating connection between the valve and servo-motor whereby the movement of the motor acts to close the valve; and variable-ratio control means coacting with the servo-motor and with the control device and with the valve, whereby, when reengagement of the clutch is to be effected, a short initial travel of the control device acts to open or close the valve and hold it there and hence actuate the motor thru a long distance, and a subsequent long movement of the control device acts to quickly open or close the valve but not hold it there and hence actuate the motor thru a short distance.

12. An automotive control adapted to be connected with means required to be actuated by power, a servo-motor operatively connected with the means, a motive-fluid line including a control valve connected with the servo-motor, a pedal operatively connected with the valve by which one's foot may open said valve to energize the servo-motor to actuate the means, an automatic device operated by movement of the servo-motor to urge the control valve closed, means cooperating with the pedal by which an operator follows up the movement of the automatic device to counteract and prevent the latter from closing the valve, and means providing a variable ratio of movement between the servo-motor and the pedal.

13. An automotive control comprising servo-motor means, a motive-fluid line and valve in communication with the servo-motor means, a control device adapted to be manipulated by an operator to actuate the valve, operating instrumentalities between the servo-motor means and valve and also between the control device and valve, and cam means having a variable profile cooperating with the operating instrumentalities to vary the rate at which the valve is actuated in relation to the movement imparted by the operator to the control device to produce a non-uniform rate of travel between the servo-motor and said control device.

14. An automotive control comprising a servo-motor having a piston rod adapted to be connected with any means to be operated a motive-fluid line and valve in communication with the servo-motor, a control device adapted to be manipulated by an operator to govern the servo-motor, operating instrumentalities interconnected between the valve and control device, and cam means operatively interconnected between the operating instrumentalities and the piston rod whereby the operator is required to manipulate the control device thru a different distance from that traveled by the servo-motor in order to maintain a setting of the valve which keeps the motor in operaiton.

15. A power control for automotive vehicles comprising a servo-motor cylinder and piston rod adapted to be connected with a vehicle-control means, a motive-fluid line and valve connected with the cylinder, a cam bar having one end mounted on a stationary pivot and swinging freely adjacent to and engaging a cam follower carried by the piston rod, a control device, and link connections extending from the control device to the cam bar and to the valve.

16. A power control for automotive vehicles comprising a servo-motor cylinder and piston rod adapted to be connected with a vehicle-control means, a motive-fluid line and valve connected with the cylinder, a cam bar having one end pivotally mounted on the cylinder and its other end terminating proximate the end of the out stroke of the piston rod, a follower carried by the piston rod and engaging the cam bar to swing said cam bar on its pivot during operation of the servo-motor, a manual-control device for an operator, and means connecting the cam bar with the manual-control device and with the valve.

17. A power control for automotive vehicles comprising a servo-motor cylinder and piston rod adapted to be connected with a vehicle-control means, a motive-fluid line and valve connected with the cylinder, a cam bar having one end pivotally mounted on the cylinder and its other end terminating proximate the end of the out stroke of the piston rod, a follower carried by the piston rod and engaging the cam bar to swing said cam bar on its pivot during operation of the servo-motor, a manual-control device for an operator, a lever means pivotally mounted on cam bar, a link connected between the manual-control device and one arm of the lever means, and a link connected between the valve and other arm of the lever means.

18. A power control for automotive vehicles comprising a servo-motor cylinder and piston rod adapted to be connected with a vehicle-control means, a motive-fluid line and valve connected with the cylinder, a cam bar having one end pivotally mounted on a bearing carried at that end of the cylinder thru which the piston rod reciprocates, said cam bar extending generally parallel to the piston rod and having its other end movably free and terminated at the end of the outstroke of the outer end of said piston rod, a cam follower carried on the piston rod and slidably engaging the cam bar from one end of said cam bar to the other, lever means pivotally mounted on the cam bar and operatively connected with the valve, and a control device convenient for manual operation and also operatively connected with the valve.

19. A power control for automotive vehicles comprising a servo-motor cylinder and piston rod adapted to be connected with a vehicle-control means, a motive-fluid line and valve connected with the cylinder, a cam bar having one end pivotally mounted on a bearing carried at that end of the cylinder thru which the piston rod reciprocates, said cam bar extending generally parallel to the piston rod and having its other end movably free and terminated at the end of the outstroke of the outer end of said piston rod, a cam follower carried on the piston rod and slidably engaging the cam bar from one end of said cam bar to the other, a bell crank pivotally carried on the free end of the cam bar, a link interconnected between one arm of the bell crank and the valve, and a manually-operable link connected with the other end of the bell crank and thru which a driver of the vehicle actuates the valve.

20. A power control for automotive vehicles comprising a servo-motor cylinder and piston rod adapted to be connected with a vehicle-control means, a motive-fluid line and valve connected with the cylinder, an arm having one end pivoted on that end of the cylinder thru which the piston rod reciprocates, said arm approximating in length the outstroke of the piston rod, said arm extending substantially parallel to said piston rod, an operating connection between the arm and valve, a manual-control device also connected with the valve, a cam profile formed on the arm, a follower on the piston rod which runs in contact with the cam profile, and means retaining the cam profile and follower in sliding contact.

21. A power control for automotive vehicles comprising an upright cylinder and a piston-rod means operable thru its lower end and adapted to be connected with a vehicle-control means, a motive-fluid line and valve connected with the upper end of the cylinder, a cam bar pivotally depending from the lower end of the cylinder and disposed alongside and engaged by the piston-rod means, spring means under the cylinder and retaining the cam bar and piston-rod means in sliding contact, a link mounted alongside the cylinder and piston-rod means and connecting the lower end of the cam bar with the valve disposed thereabove, a control device, and a link connection extending under the cylinder across the axis of the piston rod from the control device to the lower end of the cam bar and operatively connected with the first-named link.

22. A power control for automotive vehicles comprising an upright cylinder and a piston-rod means operable thru its lower end and adapted to be connected with a vehicle-control means, a motive-fluid line and valve connected with the upper end of the cylinder, a cam bar pivotally depending from the lower end of the cylinder and disposed alongside and engaged by the piston-rod means, an upright standard having its upper end anchored to the lower end of the cylinder, horizontal brace means attached to the lower end of the upright standard, a pulley journaled under the cylinder at the juncture of the standard and brace means and tangent to the axis of the piston-rod means, the piston-rod means cooperating with the upright standard means to hold itself against turning and in contact with the cam bar, spring means under the cylinder and retaining the cam bar and piston-rod means in sliding contact, a link mounted beside the cylinder and piston-rod means and connecting the lower end of the cam bar with the valve disposed thereabove, a control device, and a link connection extending under the cylinder across the axis of the piston rod from the control device to the lower end of the cam bar and operatively connected with the first-named link.

23. A power control for automotive vehicles comprising an upright cylinder and a piston-rod means operable thru its lower end and adapted to be connected with a vehicle-control means, a motive-fluid line and valve connected with the upper end of the cylinder, upright and horizontal brace means under the cylinder to mount it in service position, a pulley journaled on the brace means under the cylinder, a depending cam arm pivoted under the cylinder and generally parallel to the piston-rod means and upright-brace means, the piston-rod means operable between the cam arm and upright-brace means, a cam follower fixed on the piston-rod means and in running contact with the cam arm and held against turning tendency by the upright brace means with which said cam follower cooperates, a link operatively connecting the cam arm with the valve to automatically close the latter by cam action, and a control device operatively connected with the valve to manually open it.

24. A power control for automotive vehicles comprising an upright cylinder and a piston-rod means operable thru its lower end and adapted to be connected with a vehicle-control means, a motive-fluid line and valve connected with the upper end of the cylinder, a cam bar pivotally depending from the lower end of the cylinder and disposed alongside and engaged by the piston-rod means, said cam bar having its lower end swingably free in relation to the piston-rod means, a bell crank pivoted on the lower end of the cam bar and bodily swingable therewith and having a long arm directed away from the cam bar and a short arm pointed downwardly, means to hold the cam bar in sliding contact with the piston-rod means, a link connecting the long bell crank arm with the valve thereby adapting the cam and piston-rod means to actuate the valve, a manual control, and a link connecting the short bell crank with the manual control thereby adapting the valve to manual actuation.

25. A power control for automotive vehicles comprising a servo-motor cylinder and piston rod adapted to be connected with a vehicle-control means, a motive-fluid line and valve connected with the cylinder, a cam bar having one end mounted on a stationary pivot and swinging freely adjacent to and engaging a cam follower carried by the piston rod, a control device, link connections extending from the control device to the cam bar and to the valve, operating instrumentalities pivotally carried on and bodily swingable with the cam bar and to which the link connections are attached, and means included in the operating instrumentalities for amplifying the travel of the valve in relation to the control device.

26. A power control for automotive vehicles comprising a servo-motor cylinder and piston rod adapted to be connected with a vehicle-control means, a motive-fluid line and valve connected with the cylinder, a cam bar having one end mounted on a stationary pivot and swinging freely adjacent to and engaging a cam follower carried by the piston rod, a control device, link connections extending from the control device to the cam bar and to the valve, and means to increase the travel of the valve in relation to the travel of the control device to attain quick and sensitive starting action of the servo-motor.

27. A power control for automotive vehicles comprising a servo-motor adapted to be operatively connected with a vehicle-control means, a motive-fluid line connected with the servo-motor, a valve housing in the line and having a port open to atmosphere, movable-valve parts in the housing including a valve stem carrying spaced piston-like heads between which the force of the motive fluid acts and flows, said valve housing having air-inlet means at each end to balance equally against each end of the valve stem and piston-like heads, a push rod attached to the valve stem, lever and cam means operatively connected with the push rod, means operatively connecting the servo motor with the lever and cam means, a manual control device, and link means operatively connecting the manual-control device with the lever means.

28. A power control for automotive vehicles comprising a servo-motor adapted to be operatively connected with a vehicle-control means, a motive-fluid line connected with the servo-motor, a valve housing in the line and having a port open to atmosphere, movable-valve parts in the housing including a valve stem carrying spaced piston-like heads between which the force of the motive fluid acts and flows, said valve housing having air-inlet means at each end to balance equally against each end of the valve stem and piston-like heads, a push rod attached to the valve stem, cushion-stop means carried by the valve housing and cooperating with the movable valve ports by which a piston-like head is firmly seated on a yielding rest to steady the valve when actuated to an operative position, lever and cam means operatively connected with the push rod, means operatively connecting the servo-motor with the lever and cam means, a manual-control device, and link means operatively connecting the manual-control device with the lever means.

29. An automotive control comprising a servo-motor adapted to be operatively connected with a vehicle-control means, a motive-fluid line and control valve connected with the servo-motor, a control pedal having a heel rest, an operating connection between the heel rest and control valve, and cam means actuated by the servo-motor and interconnected between said servo-motor and the operating connection, whereby movement of the heel rest actuates the control valve in one direction to start the motor which moves the cam to reverse the setting of the valve.

30. An automotive control comprising a servo-motor adapted to be operatively connected with a vehicle-control means, a motive-fluid line and control valve connected with the servo-motor, a control pedal pivoted between its extremities and providing a toe rest and a heel rest, an operating connection between the heel rest and control valve, cam means actuated by the servo-motor and interconnected between said servo-motor and the operating connection, whereby movement of the heel rest actuates the control valve in one direction to start the motor which moves the cam to reverse the setting of the valve, and an operating connection adapted to be actuated by the toe rest and connected with a carburetor-control valve.

31. Automotive apparatus comprising a dual-purpose foot-control pedal pivoted between its ends and providing a toe rest and heel rest, a throttle arm for engine control, a link interconnected between the throttle arm and toe rest by bearing freely against said toe rest, a spring acting on the link to hold the throttle arm to closed position and hold said link against the toe rest, a servo-motor having a movable-power member adapted to be connected with vehicle-control means, a control valve for the servo-motor, an operating connection between the valve and heel rest and bearing freely against said heel rest, a spring to hold the valve closed and to hold the operating connection against the heel rest, a cam operatively connected with the servo-motor and with the operating connection, whereby down movement of the toe rests swings the throttle arm and draws the heel rest away from the operating connection, and down movement of the heel rest restores the throttle arm to engine-idling position and draws the toe rest away from the link and actuates the valve in one direction to energize the servo-motor, which operates the cam to actuate the valve in the other direction to stop the servo-motor.

32. Automotive apparatus comprising a dual-purpose foot-control pedal pivoted between its ends and providing a toe rest and heel rest, a throttle arm for engine control, a link inter-connected between the throttle arm and toe rest by bearing freely against said toe rest, a spring acting on the link to hold the throttle arm to closed position and hold said link against the toe rest, a servo-motor having a movable-power member adapted to be connected with vehicle-control means, a control valve for the servo-motor, an operating connection between the valve and heel rest and bearing freely against said heel rest, a spring to hold the valve closed and to hold the operating connection against the heel rest, a cam comprising an arm having one end pivoted on the servo-motor and operatively engaged by the movable-power member to swing the arm on its pivot, a spring holding the cam arm against the movable-power member and being somewhat stronger than the spring which holds the valve closed, said operating connection being connected with the cam arm, whereby down movement of the toe rests swings the throttle arm and draws the heel rest away from the operating connection, and down movement of the heel rest restores the throttle arm to engine-idling position and draws the toe rest away from the link and actuates the valve in one direction to energize the servo-motor, which operates the cam to actuate the valve in the other direction to stop the servo-motor.

33. A power clutch for automotive vehicles comprising a servo-motor having a movable member adapted to be connected with clutching means, a motive-fluid line and valve connected with the servo-motor, a control device having a connection with the valve, an arm fashioned into a cam having an idle cam run at each end with a cam lobe formed between the idle runs, the movable member engaging the arm by which the servo motor imparts movement to the arm when said movable member is traversing the cam lobe only, and an operating connection between the arm and the connection between the control device and valve.

34. A power brake apparatus comprising a cylinder and piston rod adapted to be connected with braking means, a motive-fluid line and control valve connected with the cylinder, an arm pivoted at one end and extending generally parallel to the piston rod with its other end movably free, a working face on the arm including a profile line starting at the free end of the arm and first gradually inclined toward the piston rod but more fully approaching the piston rod toward the arm pivot to form a faint cam lobe somewhat closer to said arm pivot than the free end of said arm, a follower carried by the piston rod and engaging the working face on the arm, an operating connection between the control valve and the free end of the arm, and a manual-control device connected with said operating connection.

35. A power brake apparatus comprising a cylinder and piston rod adapted to be connected with braking means, a motive-fluid line and control valve connected with the cylinder, an arm pivoted at one end and extending generally parallel to the piston rod with its other end movably free, a working face on the arm including a profile line starting at the free end of the arm and first gradually inclined toward the piston rod but more fully approaching the piston rod toward the arm pivot to form a faint cam lobe somewhat closer to said arm pivot than the free end of said arm, a follower carried by the piston rod and engaging the working face on the arm, an operating connection between the control valve and the free end of the arm, a manual-control device connected with said operating connection, and adjusting means detachably anchoring the cam follower on the piston rod to adjust and secure it thereon relatively to said cam lobe by which to adjust and regulate the apparatus for wear of the braking means.

36. A power brake apparatus comprising a cylinder and piston rod adapted to be connected with braking means, a motive-fluid line and control valve connected with the cylinder, a follower anchored to the piston rod by releasable means whereby said follower may be repositioned and adjusted for use and wear, a cam coacting with the follower, and manually-operable link means connected with the cam and with the control valve.

37. Power means to operate vehicle-control means comprising a servo-motor, a motive-fluid line connected therewith, a valve housing included in the line and having an air-inlet port at one end of the housing, a valve stem operating thru the other end of the housing and carrying a valve head to open and close the inlet port, a cam actuated by the servo-motor and connected with the valve stem to urge the latter in one direction, a manual-control device having an operating link, and means operatively connecting the link with the cam and with the valve stem whereby the movement of the valve is substantially multiplied over the movement of the manual-control device.

ROBERT C. RUSSELL.